United States Patent

Comeaux

[11] Patent Number: 5,842,410
[45] Date of Patent: Dec. 1, 1998

[54] NUT CRACKER

[76] Inventor: Darrell P. Comeaux, 933 Shafer St., Westlake, La. 70669

[21] Appl. No.: 62,427

[22] Filed: Apr. 17, 1998

[51] Int. Cl.[6] .............................. A23N 5/00; A47J 43/26
[52] U.S. Cl. .............................. 99/581; 30/120.2; 99/568
[58] Field of Search ..................... 99/568, 551, 574–578, 99/579–583; 30/120.1–120.5; 16/110 R, 111 R, 113, 117, 121; 68/21, 94, 243

[56] References Cited

U.S. PATENT DOCUMENTS

| | | | |
|---|---|---|---|
| 234,577 | 11/1880 | Huffman | 68/243 |
| 404,016 | 5/1889 | Quackenbush | 99/581 |
| 1,188,373 | 6/1916 | Ross | 68/243 |
| 2,031,189 | 11/1936 | Stromberg | 146/16 |
| 2,590,953 | 4/1952 | Gendler | 146/14 |
| 3,040,655 | 6/1962 | Byars | 68/243 |
| 3,249,990 | 5/1966 | Schlage | 16/121 X |
| 3,298,722 | 1/1967 | Remaley | 16/117 X |
| 3,965,810 | 6/1976 | Miller | 99/581 |
| 4,145,962 | 3/1979 | Coleman et al. | 99/572 |
| 4,182,226 | 1/1980 | Sigas | 99/578 |
| 4,944,219 | 7/1990 | Hambright et al. | 99/581 |
| 4,993,155 | 2/1991 | Andrews | 99/581 X |
| 5,495,641 | 3/1996 | Going et al. | 161/121 |

*Primary Examiner*—Timothy F. Simone
*Attorney, Agent, or Firm*—Joseph N. Breaux

[57] ABSTRACT

A torsion leverage nutcracker which allows for single hand or two hard operation and also provides ergonomically designed end plates which facilitate repetitive use of the nut cracker without repetitive traumatic injuries to the user and further wherein the ergonomic design end plate provides gripping areas for applying rotational forces to said nut cracker wherein the rotational forces are directly equally about a center point axis through said end plates thereby equally distributing rotational forces to each nut cracking rod member providing a nutcracker which easily cracks nut repetitively in comfort.

7 Claims, 3 Drawing Sheets

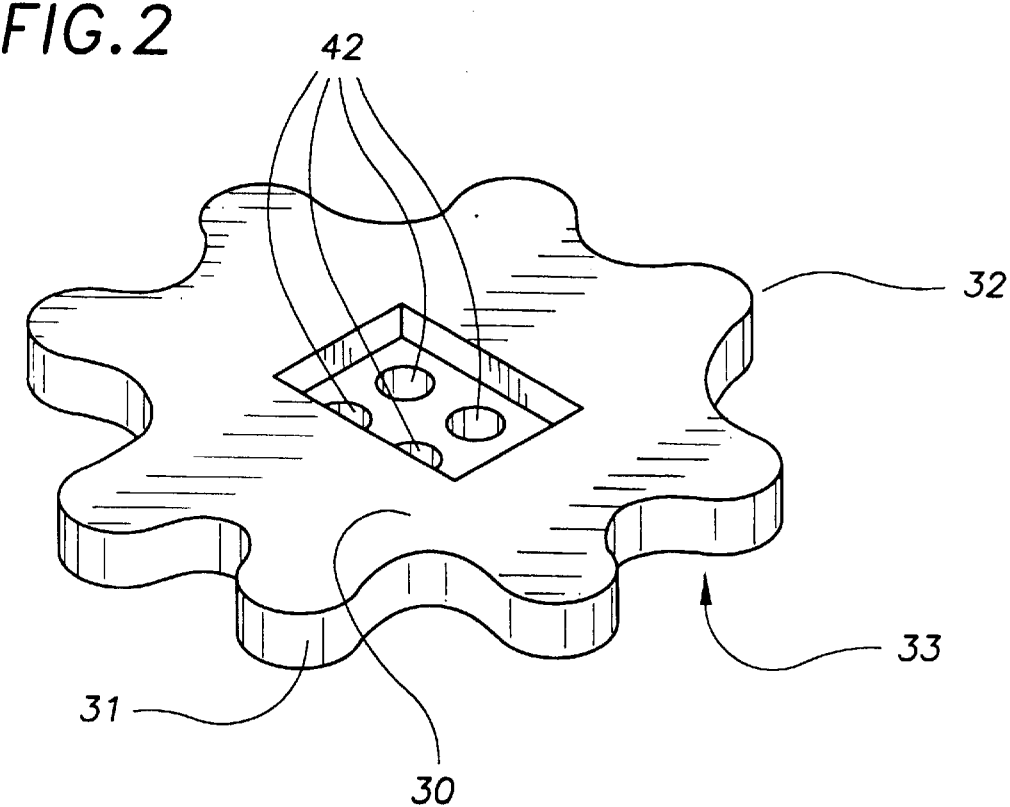
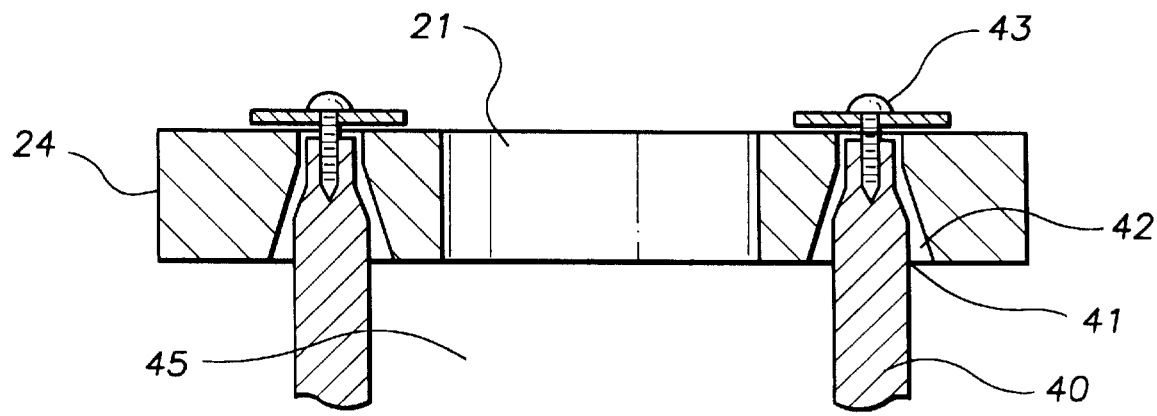

NUT CRACKER

TECHNICAL FIELD

The present invention relates to devices and methods for nut crackers and more particularly to a torsion leverage nutcracker which comprises ergonomically designed gripping end plates and a mounting means more securely mounting one end plate for single hand operation of the torsion leverage nutcracker.

BACKGROUND ART

Torsion leverage nutcrackers have been disclosed by Hambright et al U.S. Pat. No. 4,944,219 and Miller U.S. Pat. No. 3,965,810. These prior devices set forth the torsion leverage design which includes a pair of end plates with a multiplicity of nut cracking rods extending between each end plate with their ends loosely mounted to each end plate and further positioned to form a conical nut cracking area between the rods which conical area is decreased in size as the end plates are rotated in opposite directions. The Miller device includes a torsion leverage nut cracker with an opening in one of the end plates through which a nut is dropped while the Hambright patent discloses a device with four cracking rod members allowing space between the rod members to drop a nut to be cracked in addition to the use of wood to simplify construction of the device. Both of these prior devices require two hand operation. The inventor has found that both of these prior devices lack a useful means by which to grip both end plates and twist the unit as required to crack a nut or an alternative to secure one end plate to provide single hand operation. The present invention provides a means for mounting a torsion leverage nutcracker to a table surface providing single hand operation so that a second hand can be used to remove cracked nuts from the conical nut cracking area and place a new nut in the area to be cracked.

The prior devices also result in non-centered rotational forces, as an example, the Miller device has a single lever extending from each end plate for gripping the end plates which results in rotational forces which are not centered about the center axis of the end plates which thereby results in uneven torsioning of the device. Furthermore, the Hambright device does not include a useful means of gripping the end plates while applying forces to rotate the end plates about their center points. The present device provides numerous gripping valleys for placement of one's digits within the valleys so that twisting forces of the device can be concentrated on the center point axis of the end plates thereby directing more force to cracking the nut and further providing a comfortable means for using the device and thus preventing repetitive injuries to the user.

Other devices have been patented for nut cracking purposes. Most of these prior devices include means for compressing a nut between a fixed anvil and uses either a mechanically compressing ram or an inertial ram which batters the nut thereby cracking the shell. The present device is an improvement over the existing devices which utilize rams and/or inertia in that forces are directed on the nut shell equally in four equally spaced positions around the circumference of the nut. Additionally, since the present device provides an improved gripping end plate, the device allows the gripping forces to be equally disbursed between the cracking rod members. The present invention also provides an alternative to two hand operation by providing a means for securing one end plate to a work surface.

GENERAL SUMMARY DISCUSSION OF INVENTION

It is thus an object of the invention to provide a torsion leverage Nut Cracker that includes four cracking rod members retained between ergonomically designed end plates wherein the cracking rod member mounting positions on said end plates forms an internal conical nut cracking constricting area between said four cracking rod members while said ergonomically designed end plate allows for rotational forces and conical constricting area to be equally disbursed between the four cracking rod members.

It is a further object of the present invention to provide a torsion leverage Nut Cracker which includes a means for providing single hand operation of the nut cracker by providing a means for securing one end plate of said nut cracker to a table surface, or other stable work surface.

It is a further object of the invention to provide a torsion leverage Nut Cracker that allows for repeated use of the torsion leverage nutcracker apparatus without repetitive stress injuries to the user's hands which facilitates improved usage of said device for nut cracking purposes.

It is a still further object of the invention to provide a torsion leverage Nut Cracker that allows end plates to be rotated with equal forces disbursed about said end plates center axis and to said nut cracking rod members.

Accordingly, a torsion leverage Nut Cracker is provided which comprises a pair of ergonomically designed end plates with multiple finger hold valleys and contours providing a comfortable means for gripping and turning the end plates in multiple repetitions without discomfort or injury wherein a plurality of nut cracker rod members are positioned between the end plates in such a way to form a conical nut constricting area between said rod members while a nut entry aperture is provided or an end plate at the large end of said conical area and further herein the ergonomically designed end plates allows for rotation of said end plates about their center axis so that rotational forces can be equally distributed between said cracking rod members, arid wherein one end plate includes a means for securing the nut cracker to a table so that the other end plate may be rotated by a single hand thus providing single hand operation of the nut cracker, and furthermore wherein said ergonomically designed end plates result in decreased fatigue for the user of the nut cracker and decreased repetitive stress injuries for the user.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 2 is an isolated isometric view of an ergonomically designed lower plate illustrating in detail the finger valleys and contours used for gripping and rotating said end plate.

FIG. 3 is a cross section of the ergonomically designed upper plate illustrating the connection of the cracking rod members to said upper plate.

EXEMPLARY MODE FOR CARRYING OUT THE INVENTION

It can be seen from the following description that the nut cracker is used by first positioning the nut cracker in an upright position, that is, with the top end plate Facing up, and then passing a nut through the nut aperture in the top end plate which then places the nut within a conical nut constricting area formed by four nut cracking rod members which rod members are attached to the two end plates in a fashion to form the conical area with a larger end of the conical area toward the top end plate. For two hand operation, after placing the nut in said conical constriction area, the ergonomically designed end plates are gripped and rotated in opposite directions about an axis extending through the center of said conical section and said end plates. The ergonomically designed end plates allow for comfortable gripping of said end plates by use of valleys and contours providing a means for comfortably gripping the end plate while rotating. The ergonomic design leads to a more comfortable usage of the nut cracker device which in turn relieves the user of repetitive injuries while the ergonomic design also allows the twisting forces of the end plates to be concentrated about the end plate center points which in turn transfers the rotational forces equally between the four nut cracking rod members and thus leads to easier nut cracking. For one hand operation, the lower end plate is equipped with a table securing means on its bottom surface. The securing means may be a frictional securing means composed of material which grips a table surface when a user simultaneously pushes down on the top end plate while applying rotational forces. The securing means may alternatively comprise a multiplicity of suction cups attached to the bottom surface of the lower end plate which secures the lower end plate for one hand operation and rotation of the upper end plate.

Figure 1:
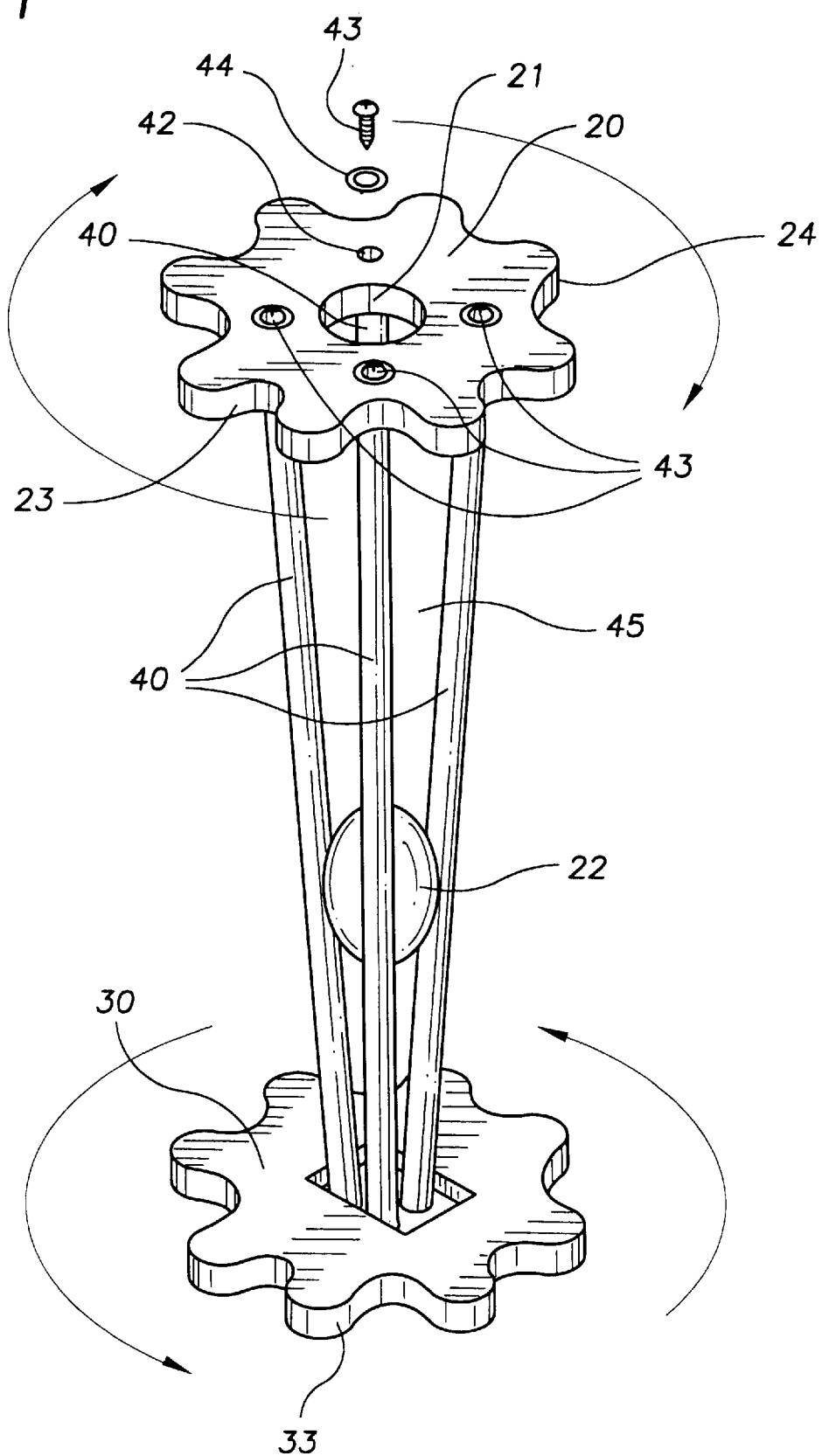
FIG. 1 is an isometric view of the improved nut cracker illustrating the upper and lower plates with ergonomically designed finger valleys and contours.

Referring to the Figures in detail, FIG. 1 illustrates an isometric view of the nut cracker in use illustration by arrows end plate rotation in opposite directions. If nut cracker securing means is employed for single hand operation, then only the upper plate 20 will be rotated for operation. The end plates comprise the upper end plate 20 and a bottom end plate 30 with four cracking rod members 40 positioned between said end plates. The upper end plate 20 includes an aperture 21 for passing a nut 22 through the upper end plate 20 and into a conical constricting area 45 formed by the four nut cracking rod members 40 placement on the two end plates. The four cracking rod members 40 are preferably constructed of hickory, oak, maple or some other hard wood which has a surface which helps grip the nut shell surface to prevent the shell from slipping when being squeezed and cracked. The four rod members 40 are also cylindrical and about one quarter to about one half inch in diameter, while the rods 40 are also about eleven to about twelve inches in length. The rods 40 also have identical end sections 41 which end sections are tapered to fit within an oversized mounting hole in said upper 20 and bottom end plates 30, while the mounting hole 43 in the end plates for mounting the rods 40 are drill at about a 10° angle so that the connected rods form the conical area 45 section between the four mounted rods. The conical area 45 allows nuts of varying size to be placed into the conical constriction area to be cracked. FIG. 3 illustrates a cross section of the mounting of the cracking rod members 40 to said upper end plate 20, the rod member connection on the lower end plate 30 are identical in arrangement. Oversized hole 42 allows movement of the rods 40 within the mounting hole 42 so that when the plates are twisted in opposite directions the conical constriction area 45 formed between the four cracking rod members is reduced in size which confines and ultimately crushes a nut placed within said area. The upper 20 and lower end plates 30 are preferably constructed of a durable material such as plastic, wood or metal. The nut cracking rod members are retained within mounting hope 42 by retainer screws 43 with flat washers.

Figure 4:
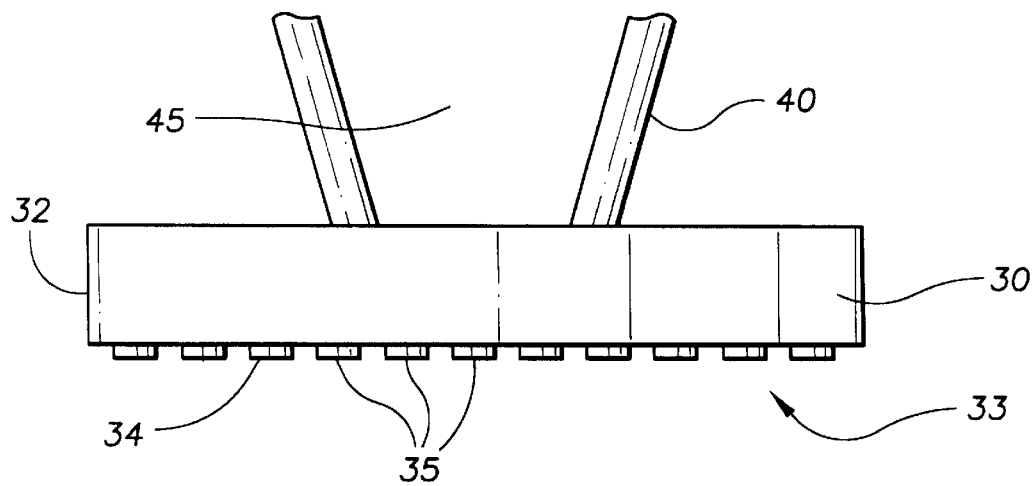
FIG. 4 is a side view of the lower end plate illustrating frictional nut cracker securing means on the bottom surface of the lower plate which allows the nut cracker to be operated with a single hand.
Figure 5:
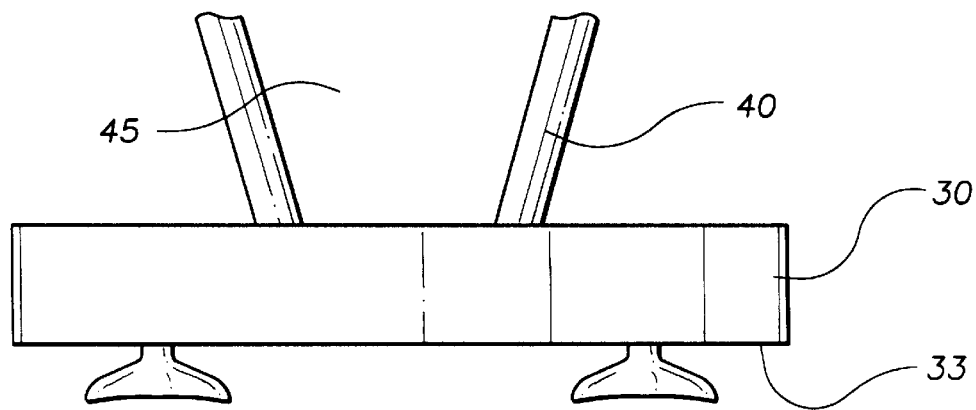
FIG. 5 is a side view of the lower end plate illustrating suction cup nut cracker securing means on the bottom surface of the lower plate which allows the nut cracker to be operated with a single hand.

The ergonomically designed upper end plate 20 includes contoured valleys 23 positioned about an outside perimeter 24 of the end plate which provide multiple gripping areas for the user's fingers. Furthermore, the edges of the upper end plate are rounded to further add ergonomic comfort for using the apparatus. Lower end plate 30 also includes a multiplicity of contoured indentions 31 about the outside perimeter 32 of the end plate for receiving a users fingers for ease of use of the device for two hand operation if desired. As with the upper end plate edges the lower end plate edges are also rounded to add to ergonomic comfort when using the device. For single hand operation, which was not possible with the prior torsion leverage nut crackers, the lower end plate 30 includes a nut cracker securing means positioned on the bottom surface 33 of the lower end plate 30. The securing means may comprise a frictional securing means 34 as illustrated in FIG. 4 which grips a table surface when the user simultaneously pushes down on the upper plate 20 while applying rotational forces. The frictional securing means 34 is preferable continuous on the entire bottom surface 33 of the lower end plate 30, and is preferably a NEOPRENE™ pad adhered to the bottom surface which further preferable includes numerous raised knobs 35 which increase the frictional gripping force. An alternative securing means is disclosed in FIG. 5 and comprises a plurality of suction cups 36 attached to the bottom surface 33 of the lower end plate 30.

As indicated on FIG. 1 the means of operation for two operation of the device requires rotation of each end plate in opposite directions as indicated by arrows about each end plate in FIG. 1. As the end plates are rotated in opposite directions the attachment areas 41 and 42 of the nut cracking rod members with the end plates allows for movement of the rod ends within the attachment holes. The amount of slack between said cracking rod member connecting end 41 and said connecting hole should be sufficient to allow rotation of the end plates to a point where the rods are substantially parallel with a center line axis extending longitudinally between a center point of the upper end plate and a center point of the lower end plate.

What is claimed is:

1. A torsion leverage nut cracker which comprises a multiplicity of elongated nut cracking rod members positioned between upper and lower end plates while the upper end plate has a centrally located nut aperture and a plurality of widely spaced apertures for mounting an end of each elongated rod member and the lower end plate comprises a plurality of apertures closely placed in said central portion for attaching another end of said elongated rod members wherein the rod members are spaced apart on the end plates forming a conical area between said rod members, the upper and lower end plates further comprising ergonomically designed contours positioned around a perimeter of each end plate which include a plurality of valleys providing gripping areas which receive a user's fingers and which provide a gripping means for a user to grip said end plates repetitively and in comfort, and a nut cracker securing meats attached to a bottom surface of the lower end plate which securing means provides a means for securing the nut cracker to a work surface so that a user can operate the nut cracker with one hand by rotating the upper end plate.

2. The nut cracker of claim 1 wherein said multiplicity of elongated nut cracking rod members comprise, four elongated nut cracking rod members which are constructed of a hard wood wherein said hard wood is selected from a group consisting of maple, oak, hickory, and nut.

3. The nut cracker as set forth in claim 1 wherein said ergonomically designed end plates further comprise, a means for directing rotational forces of said end plates about the center axis of said end plates so that the rotational forces can be equally distributed to said elongated rod members.

4. The nut cracker as set forth in claim 3 wherein said means for directing rotational forces to said elongated rod members further comprises ergonomically designing said end plates so that a user may grip the end plates comfortably and tightly while applying rotational forces to said end plate thereby preventing torsional forces to be applied in a concentric manner.

5. The nut cracker as set forth in claim 1 wherein said nut cracker securing means further comprises, a frictional material applied to a bottom surface of the lower end plate, so that when nut cracker is placed in an upright position with the upper end plate up and lower end plate down and the frictional material on the lower end plate bottom surface contacts a work surface and further when a user applies a downward force simultaneously with a rotational force on the upper end plate for purposes of cracking a nut, the frictional material holds the nut cracker lower end plate securely so that the nut cracker may be operated with one hand.

6. The nut cracker as set forth in claim 1 wherein said nut cracker securing means further comprises, a plurality of suction cups attached to a bottom surface of the lower end plate which hold the lower end plate secured to a work surface while a user uses a single hand to rotate the upper end plate and operate the nut cracker.

7. A torsion leverage nut cracker which comprises four elongated nut cracking rod members positioned between upper and lower end plates while the upper end plate has a centrally located nut aperture and a plurality of widely spaced apertures for mounting an end of each elongated rod member and the lower end plate comprises a plurality of apertures closely placed in said central portion for attaching another end of said elongated rod members wherein the rod members are spaced apart on the end plates forming a conical area between said rod members, the four elongated nut cracking rod members are further constructed of a hardwood wherein said hard wood is selected from a group consisting of maple, oak, hickory, and walnut, the upper and lower end plates further comprising ergonomically designed contours positioned around a perimeter of each end pale which Include a plurality of valleys providing gripping areas which receive a user's fingers and which provide a gripping means for a user to grip said end plates repetitively and in comfort, said ergonomically designed end plates further comprise, a means for directing rotational forces of said end plates about a center axis of said end plates so that the rotational forces can be equally distributed to said elongated rod members thereby preventing torsional forces from being applied in a concentric manner, and a nut cracker securing means attached to a bottom surface of the lower end plate which further comprises a fractional material applied to a bottom surface of the lower end plate, so that when the nut cracker is placed in an upright position with the upper end plate up and lower end plate down and the frictional material on the lower end plate bottom surface contacts a work surface and further when a user applies a downward force simultaneously with a rotational force on the upper end plate for purposes of cracking a nut, the frictional material holds the nut cracker lower end plate securely so that the nut cracker may be operated with one hand.

\* \* \* \* \*